3,740,418
RADIOACTIVE SCANNING PREPARATION

Puthucode N. Rajamani and Howard S. Stern, North Brunswick, Dasika R. K. Murty, Kendall Park, and Thomas A. Haney, East Brunswick, N.J., assignors to E. R. Squibb & Sons, Inc., New York, N.Y.
No Drawing. Filed July 1, 1970, Ser. No. 51,707
Int. Cl. A61k 27/04
U.S. Cl. 424—1              6 Claims

ABSTRACT OF THE DISCLOSURE

Disclosed herein is a radioactive complex having useful urinary radio-pharmacological properties to discern if the kidney or other organs of the body are functioning properly.

BACKGROUND OF THE INVENTION

Technetium-99m has become a well recognized medical diagnostic tool. Its six hour half-life and lack of beta radiation reduce the hazard to the patient and still provides the physician with a scan that reveals the functioning of the organ in question.

Technetium-99m, as the pertechnetate ion, was first used as a radionuclide in brain scans. Thereafter additional complexes and/or formulations of biological interests labeled with technetium-99m were utilized as tracers by the radiologist since it was found that they would localize in various organs of the body. Among the many tracers now available are technetium-99m sulfur colloid and human serum albumin labeled with technetium-99m. The latter formulation is used for heart and placenta scanning, whereas the former is used for liver scanning. U.S. Pat. No. 3,466,361, issued Sept. 9, 1969, discloses a process for preparing technetium-99m complexes having useful genito-utinary radiopharmacological properties wherein technetium-99m is joined with calcium-organo chelates in the presence of ferrous sulfate. Another formulation is disclosed in Radiology, 95: 533–537, June 1970; entitled "A 'Kit' for Preparation of High Specific Activity $^{99m}Tc$ Albumin for Cisternography and Blood-Pool Imaging," wherein a ferric chloride sodium ascorbic acid reaction is utilized to produce a product for heart, placenta and cisternographies. A complex of technetium-iron-ascorbic acid and a process for its preparation is disclosed in the American Journal of Roentgenology; Radium Therapy and Nuclear Medicine, vol. 101, No. 1, pp. 152–156, for the purpose of scanning the brain.

Each of the above formulations are prepared by methods which required diligent adherence to pH adjustment, heat, or time intervals and utilized the reduced form of technetium-99m.

Summary of the invention

This invention relates to a process for preparing a complex of a radioisotope. More particularly, it relates to a simplified method of preparing a radiopharmacological complex that contains technetium-99m comprising:

(1) preparing a saline solution of technetium-99m;
(2) mixing the prepared technetium-99m with a solution of ferrous ions and dehydroascorbic acid;
(3) adjusting the pH of the solution to a pH of from about 7.0 to 11 with a base;
(4) adding a complexing agent to the reaction mixture; and
(5) removing the technetium-99m complex thus formed for injection.

Utilizing the preferred procedure of this invention yields a complex that does not require technetium-99m to be in a reduced form and is taken up by the kidney rapidly and more effectively than complexes known to the prior art.

Detailed description

The saline solution of technetium-99m can be obtained by elution of a commercially available sterile pyrogen-free technetium-99m generator as disclosed in U.S. Pat. No. 3,369,121. The eluate from the generator may contain from between 0.5 to 10 millicuries of technetium-99m per ml. The volume of eluate used in this invention is controlled by the radioactivity desired in the final complex. The volume range preferred is from 1 to 5 ml.

The reaction solution of ferrous ions and dehydroascorbic acid is prepared by reacting stoichemetric amounts of a ferric salt, e.g., ferric sulfate or ferric halide (e.g., ferric chloride, ferric bromide, and so forth) with ascorbic acid. An excess of ascorbic acid sufficient to reduce the ferric ions to ferrous ions and prevent oxidation of ferrous to ferric is preferred in preparation of this solution; however, the desired results are achieved when stoichemetric amounts are utilized. It has been discovered that ascorbic acid oxidizes rapidly to dehydroascorbic acid and then to other acids which inhibits the formation of a useful radioactive complex. This is true as reaction solutions prepared in the normal manner of mixing an ionic ferric solution (e.g., ferric chloride) with ascorbic acid only has a stability of from two to six weeks when it is to be utilized to form a radioactive complex. Whereas, the reaction solution in the instant invention is prepared in a manner to assure the presence of sufficient dehydroascorbic acid in the reaction solution for about six months to a year.

The preferred reaction solution is prepared by combining and dissolving from about 0.5 to 25 mg./ml. of ferric chloride·$6H_2O$ with about 0.5 to 25 mg./ml. of ascorbic acid with the preferred amount being from about 3.5 to 6 mg./ml. of ferric chloride·$6H_2O$ to an equal amount of ascorbic acid. The reaction mixture is maintained under an anaerobic atmosphere, e.g., vacuum, nitrogen gas, helium or other inert gas. This is accomplished by passing nitrogen through the reagents as they are being combined, 20–30° C. preferred. It is to be understood that the ferric chloride·$6H_2O$ can be combined with ascorbic acid or vice-versa. After the reaction is completed, the solution is placed in vials that are also maintained in an anaerobic condition, e.g., under nitrogen gas. The vials of reaction solution are then maintained at a temperature of from about −5 to 15° C. with the preferred temperature being from about 5 to 10° C., until they are ready for use.

Utilizing this method of preparation, the stability of the reaction solution is assured for a period of about six months to one year. The range of ferrous ions is maintained in an operable range of from about 0.1 to 5.2 milligrams ferrous ions per milliliter of solution and dehydroascorbic acid of from about 0.5 to 25 milligrams per milliliter of solution. The pH of this solution prior to filling the reaction vials is adjusted to a pH of about 2 to 5. This is accomplished by adding sufficient hydrogen chloride to adjust the pH as desired. The preferred pH range being of about 3.2 to 3.7.

The complexing agent to be utilized in the practice of this invention can be any polyvalent cation complexing agent, such as diethylenetriaminepentaacetic acid, ethylenediaminetetraacetic acid, nitrilotripropionic acid, or N-2, hydroxyethyliminodiacetic acid. The complexing agent is dissolved in water for injection.

The concentration of the complexing agent is such that a pH in the final iron-ascorbic-technetium-99m complex will be from about 4.0–8.0. The preferred concentration of the complexing agent is from 2.0–3.0 mg./ml. with about 0.1 to 10 mg./ml. being also within the operable range. It has also been found that a concentration of from 0.15 to 7 mg./ml. is also within a desirable range.

The process of preparing the iron-ascorbic-technetium-99m complex of the instant invention comprises merely reacting the saline solution containing technetium-99m obtained from the generator (about 0.5 to 20 ml.) with the contents of the reaction solution vial. A strong base is then added to the thus formed reaction mixture to adjust the pH to a range of about 7 to 11 with the preferred pH range being from about 7.2 to 8.5. An inorganic or organic base may be utilized, such as an alkaline metal hydroxide (e.g., sodium hydroxide or potassium hydroxide) or pyridine, respectively. It is understood that the final product is to be utilized intravenously, therefore all reagents are contained in suitable aseptic syringes and/or vials.

After adjustment to the proper pH, which need be only alkaline, the complexing agent is added to yield the desired complex which is ready for injection as all reagents utilized have been pre-sterilized and pyrogen free.

The following examples are illustrative of this invention, all temperatures are in degrees centigrade, unless otherwise stated:

EXAMPLE 1

(a) Reaction Solution A

Approximately 800 mls. of sterile, pyrogen-free water is heated to about 100° C. Nitrogen gas is bubbled through the water until the temperature cooled to 20–30° C. Five grams of ferric chloride·$6H_2O$ is dissolved in the water followed by the dissolution of five grams of ascorbic acid. A mechanical stirrer and a bubbling stream of nitrogen is used for agitation. Normal sodium hydroxide solution is added to the mixture until the pH is 3.5. The final volume is adjusted to one liter with sterile, pyrogen-free water that is boiled and cooled to 20–30° C. with a bubbling stream of nitrogen. The mixture is sterilized through a sterilizing micron membrane filter using nitrogen gas to force it through the filter. Sterile vials are filled with 2 ml. of solution, each under a nitrogen atmosphere and sealed. The filled vials are stored under refrigeration (about 5° C.) and protected from light.

(b) Preparation of basic solution (Syringe 1)

An 0.07 N sodium hydroxide solution is prepared by dissolving 2.8 gms. of sodium hydroxide in one liter of sterile, pyrogen-free water. The solution is sterilized by processing it through a sterilizing micron membrane filter. Sterile syringes are filled with 2 ml. each, sealed, and stored with the reaction vials of (a) above.

(c) Preparation of complexing agent (Syringe 2)

Approximately 750 mls. of sterile, pyrogen-free water is brought to a temperature of about 100° C. While still hot 2.5 gms. of diethylenetriaminepentaacetic acid is added and dissolved. The temperature is allowed to cool and at about 20–30° C. the volume is adjusted to one liter with sterile, pyrogen-free water. The solution is sterilized by processing it through a sterilizing micron membrane filter. Sterile syringes are filled with 2 ml. each, sealed, and stored with the reaction vials.

EXAMPLE 2

Analysis of $Fe^{++}$, $Fe^{+++}$, dehydroascorbic acid and residual ascorbic acid in the stored reaction vials Utilizing the vials prepared from reaction solution A analysis was made by colormetric o-phenantroline reaction procedures of the ferrous ion concentrations therein over the period of time as indicated in Table I.

Generally, the ferric chloride-ascorbic acid in the sample should contain sufficient ascorbic acid to reduce all the ferric ion to the ferrous form. The ferrous ion concentration, therefore, can be obtained directly by the ferrous: o-phenanthroline reaction and calculated as $FeCl_3 \cdot 6H_2O$. If sufficient ascorbic acid are not present, the solution would contain a mixture of ferric and ferrous ion. In such a situation total ion is assayed by converting the ferric ion present to ferrous ion with excess hydroquinone and the total ferrous ion is assayed with o-phenanthroline. To assay for ferrous ion only in the mixture, ammonium fluoride is added to complex the ferric ion. This eliminates the interference of ferric ion in the ferrous: o-phenanthroline reaction.

To determine total ascorbic acid, 2,6-dichlorophenolindophenol dye is added to oxidize the residual ascorbic acid to dihydroascorbic acid. The total dihydroascorbic acid, a diketone, is precipitated with 2,4-dinitrophenylhydrazine by heating for 10 minutes at 100° C. The osazone chromagen is solubilized in acid and measured spectrophotometrically. Appropriate levels of ascorbic acid are reacted as above to establish a standard curve.

To determine the dihydroascorbic acid in the sample, the dihydroascorbic acid is coupled directly with dinitrophenylhydrazine and the chromagen is measured as above. In this case, the use of the dichlorophenolindophenol dye is omitted from the above procedure and only the dihydroascorbic acid formed by the oxidation of ascorbic acid by the ferric chloride in the sample is precipitated as the osazone with dinitrophenylhydrazine.

The residual (or excess) ascorbic acid in the sample is calculated by difference from the above data. The table below indicates that the complex formed over a period of one year is stable.

TABLE I

|  | Initial | 1 mo. | 2 mo. | 3 mo. | 6 mo. | 12 mo. |
|---|---|---|---|---|---|---|
| $Fe^{++}$ | 1.08 | 1.03 | 1.01 | 1.00 | 1.23 | 1.02 |
| $Fe^{+++}$ | None | None | None | None | None | None |
| DAA[1] | 1.90 | 1.36 | 2.36 | 2.88 | 2.60 | 2.36 |
| Residual AA[2] | 3.20 | 3.68 | 1.52 | 1.24 | 0.60 | 0.12 |

[1] Dehydroascorbic acid.
[2] Residual ascorbic acid.

EXAMPLE 3

Preparation of the $Tc^{99m}$-diethylenetriaminepentaacetic acid complex with the stored solutions and renal and liver uptake in the rat Five ml. of a $Tc^{99m}$ solution obtained from a $Tc^{99m}$ sterile generator with an isotonic saline solution that contained 0.02% sodium hypochlorite is added to the vial containing Reaction Solution A. The contents of Syringe 1 are added and mixed. The contents of Syringe 2 are then added and mixed. Thirty minutes after injecting 0.3 ml. of the formed complex into the external jugular vein of the rat, the percent of the injected dose in the kidneys and liver is determined.

PERCENT OF INJECTED DOSE

|  | Initial | 1 mo. | 2 mo. | 3 mo. | 6 mo. | 12 mo. |
|---|---|---|---|---|---|---|
| Kidneys | 17.87 | 16.49 | 15.60 | 13.30 | 18.05 | 13.00 |
| Liver | 2.23 | 1.51 | 1.79 | 1.90 | 2.05 | 1.56 |

The above indicates that the complex formed by the reaction solution of this invention maintains its effectiveness for a period of at least twelve months.

EXAMPLE 4

Reaction Solution B

Five hundred milligrams (500 mg.) of ferrous chloride·$4H_2O$ is dissolved in approximately 80 ml. of water for injection. Five hundred milligrams (500 mg.) of dehydroascorbic acid is also added and dissolved. The pH of the solution is adjusted to 3.6 with N sodium hydroxide solution, then the volume adjusted to one liter with water for injection. Vials are filled with 2 ml. each under anaerobic conditions.

EXAMPLE 5

Preparation of the $Tc^{99m}$-diethylenetriaminepentaacetic acid complex using ferrous chloride and dehydroascorbic acid and its renal uptake in the rat Five ml. of a $Tc^{99m}$ solution that is eluted from a $Tc^{99m}$ sterile generator with an isotonic saline solution that contained 0.02% sodium hypochlorite is added to the vial containing Reaction Solution B. The contents of Syringe 1 is added and mixed. The pH is 9.5. The contents of Syringe 2 is added and mixed. The pH is 5.0. Thirty minutes after injecting 0.3 ml. of the complex formed into the external jugular vein of the rat, the percent of the injected dose in the kidneys and liver is determined.

| | Percent of injected dose |
|---|---|
| Kidneys | 13.04 |
| Liver | 2.08 |

This example illustrates that technetium-99m need not be in the reduced state to form the complex of the invention.

EXAMPLE 6

Similar results as those indicated in Table I are obtained utilizing nitrilotriproponic acid in lieu of diethylenetriaminepentaacetic acid in Example 1.

EXAMPLE 7

Similar results as those indicated in Table I are obtained utilizing (N)-2-hydroxyethyliminodiacetic acid in lieu of diethylenetriaminepentaacetic acid as a complexing agent in Example 1.

EXAMPLE 8

Similar results as those indicated in Table I are obtained utilizing ferric sulfate in lieu of ferric chloride.

What is claimed is:
1. A radiopharmacological complex that contains technetium-99m prepared by:
   (a) preparing a saline solution of technetium-99m;
   (b) mixing the prepared technetium-99m with a solution of ferrous ions and dehydroascorbic acid;
   (c) adjusting the pH of the solution to a pH of from about 7.0 to 11 with a base;
   (d) adding a complexing agent to the reaction mixture; and
   (e) removing the technetium-99m complex thus formed for injection.
2. A process for preparing a technetium-99m iron-ascorbic acid complex which comprises:
   (a) preparing a saline solution of technetium-99m;
   (b) mixing the prepared technetium-99m with a solution of ferrous ions and dehydroascrobic acid;
   (c) adjusting the pH of the solution to a pH of from about 7.0 to 11 with a base;
   (d) adding a complexing agent to the reaction mixture; and
   (e) removing the technetium-99m complex thus formed for injection.
3. A process in accordance with claim 2 wherein the reaction solution contains from about 0.5 to 25 mg./ml. of a ferric salt and from 0.5 to 25 mg./ml. of ascorbic acid.
4. A process in accordance with claim 3 wherein the reaction solution contains ferrous ions is present in from about 0.1 to 5.2 mg./ml. and ascorbic acid in from about 0.5 to 25 mg./ml.
5. A process in accordance with claim 3 wherein the complexing agent is a polyvalent cation complexing agent.
6. A process in accordance with claim 5 wherein the complexing agent is selected from the group consisting of diethylenetriaminepentaacetic acid, ethylenediaminetetraacetic acid, nitrilotripropionic acid, or N-2, hydroxyethyliminodiacetic acid.

References Cited

UNITED STATES PATENTS

| | | | |
|---|---|---|---|
| 3,446,361 | 9/1969 | Richards et al. | 252—301.1 R X |
| 3,468,808 | 9/1969 | Arino | 252—301.1 R |
| 3,436,354 | 4/1969 | Gemmill et al. | 252—301.1 R |

BENJAMIN R. PADGETT, Primary Examiner

U.S. Cl. X.R.

250—106 T; 252—301.1 R